United States Patent [19]
Nanba et al.

[11] 3,849,786
[45] Nov. 19, 1974

[54] LIGHT INTEGRATING TYPE LIGHT DETECTOR CIRCUIT WITH PHOTOVOLTAIC CELL

[75] Inventors: Yasuhiro Nanba; Motonobu Matsuda, both of Osaka, Japan

[73] Assignee: Minolta Camera kabushiki Kaisha, Osaka-shi, Japan

[22] Filed: Dec. 8, 1972

[21] Appl. No.: 313,498

[30] Foreign Application Priority Data

Dec. 10, 1971 Japan .............................. 46-99391
Dec. 11, 1971 Japan .............................. 46-99861

[52] U.S. Cl. .............................................. 354/51
[51] Int. Cl. .......................................... G03b 7/08
[58] Field of Search ........... 95/10 C, 10 CT, 10 CC, 95/53 EA, 53 EB; 250/211, 212, 214 P; 330/9; 328/2, 12; 354/51

[56] References Cited

UNITED STATES PATENTS

| | | | |
|---|---|---|---|
| 3,441,863 | 4/1969 | Moriyasu | 330/9 |
| 3,620,143 | 12/1968 | Burgarella | 250/214 P X |
| 3,626,825 | 12/1971 | Years | 250/211 J |
| 3,641,890 | 2/1972 | Ono | 95/10 CT |
| 3,641,891 | 2/1972 | Burgarella | 95/53 EB X |
| 3,648,580 | 3/1972 | Yanagi | 95/10 CT |
| 3,673,415 | 6/1972 | Yoshimura | 250/212 |
| 3,679,905 | 7/1972 | Watanake | 95/10 CT X |

*Primary Examiner*—Joseph P. Peters, Jr.
*Attorney, Agent, or Firm*—Staas, Halsey & Gable

[57] ABSTRACT

This invention relates to a light integrating type light detector circuit, comprising a parallel circuit formed with a photovoltaic cell, an integrating capacitor and a timing switch for starting integration, and a trigger circuit which is triggered when a voltage of the parallel circuit has reached a predetermined level within a range of a voltage charged with a charging current substantially equal to a short-circuit current of the photovoltaic cell, in which an output time characteristic in inverse proportion to the illumination of light received by the photovoltaic cell is obtained.

29 Claims, 20 Drawing Figures

LIGHT INTEGRATING TYPE LIGHT DETECTOR CIRCUIT WITH PHOTOVOLTAIC CELL

BACKGROUND OF THE INVENTION

1. Field of the Invention

This invention relates to a light integrating type light detector circuit with photovoltaic cell.

2. Description of the Prior Art

At present, a photoconductive element such a as CdS element is widely used as a light receiving element of an exposure meter for use in electronic exposure controlled cameras; but such photoconductive elements are slow in response to the light it receives and poor in stability and especially so in the case where a scene to be photographed is dark. Further, it has also been proposed to use a selenium photocell, a silicon photocell or like photovoltaic cell as a light receiving element in an electric control circuit for controlling an electric shutter or the flash interval of a strobe unit as will be described later on.

The above-mentioned photoconductive element is employed in a steady light condition, but it cannot be used for the electronic exposure controlled camera in the case where the exposure light changes rapidly like a flash light; especially it cannot be used with a light adjusting strobe unit whose light emission is stopped by an electric signal when the amount of light emitted from the strobe reaches a value necessary for photographing.

On the other hand, it has been suggested to use a silicon photovoltaic cell whose response to light is extremely rapid, as a light receiving element of an exposure meter for the electronic exposure controlled camera. With the photovoltaic cell; however, its output in response to incident light, that is, its output voltage and its output current are extremely small, as compared with the photoconductive element. For effective amplification of such a small output, the circuit becomes very complicated and expensive and this has prevented the realization of an electronic exposure controlled camera which employs the silicon photovoltaic cell and makes good use of its characteristics.

A brief description will be given first of characteristics of the silicon photovoltaic cell (hereinafter referred to as an Si cell). FIG. 1A shows the relationships of an output voltage from the Si cell and a voltage impressed to logarithmic values of an output current therefrom, in which the left and right of the abscissa show the output voltage from the Si cell and the voltage impressed thereto from the outside, respectively, and the ordinate of the output current based on received light on a log scale.

The graph with curves shows the relationships of the output voltage and current from the Si cell to the above-mentioned coordinate axes with illumination being used as a parameter. For example, where illumination is 0.1*lux* (*lx*), in a circuit depicted in FIG. 1B for obtaining values of the curves, an increase in the resistance value of its resistor r causes an increase in the value of a voltmeter V connected in parallel with both ends of the resistor *r* but a gradual decrease in the current flowing in an ammeter A. However, when the resistance value exceeds a certain value, the voltage does not increase and only the current rapidly decreases. Where the resistance value of the resistor *r* is infinity, the voltage is about 120mV. The voltage at this time is referred to as an open-circuit voltage and represented with $V_{op}$. As will be seen from the graph, the open-circuit voltage is proportional to the logarithmic value of light.

On the contrary, a decrease in the resistance value of the resistor *r* causes a decrease in the voltage and an increase in the current, but when the resistance value becomes smaller than a certain value, the current value gradually approaches a constant value. The current value (on the ordinate) when the resistance value of the resistor *r* is zero to reduce the voltage to zero, is referred to as a short-circuit current, which is identified by $I_{sh}$. This shortcircuit current is substantially perfectly proportional to the received light.

The characteristics shown on the right side of the ordinate of FIG. 1A show those in the case where a voltage is applied in series to the Si cell from the outside. With an increase in the external voltage, the current increase slightly but this is because of the facts that a leakage current $I_n$ from the Si cell is added to the short-circuit current $I_{sh}$ and that the leakage current $I_n$ increases with the increase in the external voltage.

The characteristic curve changes with temperature and in the case of, for example, 1*lux*, the characteristic curve varies with a temperature rise as indicated by a broken line marked (D). Namely, the open-circuit voltage $V_{op}$ decreases and the short-circuit current $I_{sh}$ does not substantially undergo any change but the leakage current $I_n$ remarkedly increases.

Accordingly, it will appear from the foregoing that, in order to use the Si cell with low illumination with less temperature errors, it is desirable to use the Si cell while holding the output current as close to the short-circuit current $I_{sh}$ as possible. In addition, using the cell under such condition is also desirable for enhancement of its response to light, as will become apparaent from the following explanation.

FIG. 2 is a diagrammatic representation of a circuit equivalent to the characteristics of the Si cell. Reference character P represents an action which provides a constant current source generating a current proportional to the intensity of light received by the Si cell and this current is equal to the shortcircuit current $I_{sh}$.

Reference character Q identifies a diode of a PN junction of the Si cell, which is identical with that of usual diodes and the relation of the current voltage is given by the following equation:

$$I = A\,(e^{qV/KT} - 1)$$

where *A* is a constant, *K* Boltzmann's constant, *I* current, *T* absolute temperature, *V* voltage and *q* electron charge.

Therefore, in the case of the open-circuit voltage $V_{op}$, almost all current generated by source *P* flows in diode component *Q*, so that the relation between $V_{op}$ and $I_{sh}$ is expressed by the following equation:

$$I_{sh} = A(e^{qV_{op}/KT} - 1)$$

Reference character R indicates a resistance converted from a current flowing in the surface of the Si cell or a package and it has a very large value.

Reference character C represents a capacitor component in the PN junction plane of the Si cell, which usually has a value of thousands PF. The capacitor component C serves to retard the response of the Si cell and becomes detrimental when the Si cell is used in an electronic shutter circuit. Especially when the Si cell is used under the condition of the open-circuit voltage $V_{op}$, the current generated by P based on the incidence of light flows in the diode Q and also in component C to charge it. Consequently, the output voltage does not immediately reach the open-circuit voltage $V_{op}$. Where the incident light is low in intensity, this tendency is very prominent, and the delay in the output voltage becoming equal to the open-circuit voltage $V_{op}$, is greater than that in the response of the photoconductive element. The same is true of the leakage current $I_n$ and capacitor component C is previously charged in opposite polarity because of application of the voltage from the outside. Therefore, even if P produces the short-circuit current $I_{sh}$ based on the reception of light, no output is produced for a little while until discharging of capacitor component C ends, so that the response is extremely retarded. Accordingly, the smaller the output voltage from the Si cell and the external voltage impressed thereto become, the more the response to light becomes excellent.

It will appear from the foregoing that where the Si cell is employed as a light receiving element of the electronic exposure controlled camera, it is the most desirable to minimize the voltage across the Si cell, to hold it lower than 1/10 to 1/20 of the open-circuit voltage $V_{op}$ for the lowest illumination to be measured and to make it equal to the short-circuit current $I_{sh}$ so as to reduce temperature error, to enable measurements of low illumination and to assure rapid response to light. In this case, however, if the incident light is of low illumination and if temperature is high, the open-circuit voltage $V_{op}$ is also very low, so that an amplifier circuit of excellent performance is required.

Referring to FIGS. 3 to 5, known amplifier circuits will be described (refer to, for example, U.S. Pat. No. 3,570,381; U.S. Pat. No. 3,626,825; Electronics, 38:22, p. 66; and Electronics, 35:35, p48 to 51), Generally, in electronic shutters of the electronic exposure controlled camera including those employing the photoconductive element as a light receiving element, upon opening of shutter blades by a shutter release operation to initiate exposure, the light receiving element receiving light corresponding to exposure light charges a capacitor with a photocurrent dependent upon the received illumination light. When the charging voltage on the capacitor reaches a preset value, a trigger circuit operates to actuate a relay to close the shutter blades, thus obtaining correct exposure.

The circuit using the Si cell for the above operation is such as shown in FIG. 3, in which a battery 31 is connected in series to an Si cell 33 and they constitute a series circuit together with a capacitor 34, which is charged with a photocurrent converted by the Si cell 33. Reference numeral 35 indicates a timing switch for discharging which is connected in parallel to the capacitor 34. Reference numeral 32 designates a variable resistor, which sets a trigger level of a trigger circuit 36 supplied with a voltage from the capacitor 34. Reference numeral 37 identifies a relay which is actuated with the output from the trigger circuit 36. Reference numerals 39 and 38 represent a power source battery and a power source switch respectively. With the circuit of such a construction, it is difficult to set the trigger level lower than 300mV with the variable resistor 32, so that the voltage of the capacitor 34 is also required to be higher than 300mV and that of the battery 31 is also required to be higher than 300mV. Accordingly, the characteristic of the Si cell 33 becomes such as indicated by the broken line A in FIG. 1A and where the brightness of an object to be photographed is low, an error increases and the output current is not proportional to the intensity of the incident light. Further, in FIG. 2 the capacitor component C of the Si cell is charged in opposite polarity, so that the sensitivity to light is extremely low and cannot be used in practice.

The circuit shown in FIG. 4 is designed so that the output current from an Si cell 43 may approach the short-circuit current $I_{sh}$ so as to reduce the defects of the circuit of FIG. 3.

In FIG. 4, reference numerals 41 and 42 disignate resistors for applying a bias voltage to a transistor 50. The Si cell 43 and a capacitor 44 are connected to the emitter and the collector of the transistor 50 respectively, a timing switch 48 is connected in parallel with the capacitor 44 and a voltage across the capacitor 44 is applied to a trigger 46. In the circuit such as described above, a voltage applied to the Si cell 43 becomes such as indicated by the broken line B in FIG. 1A. The reason why the broken line B is inclined to the coordinate axis is that the base-emitter voltage of the transistor 50 varies with a current. Therefore, coincidence of the output current with the short-circuit current $I_{sh}$ is possible for a certain brightness but impossible for other brightness. It is possible, of course, to shift the broken line B in parallel by changing the bias voltage of the transistor 50 in accordance with brightness but however much the bias may be altered, the measurement range cannot be widened. Where illumination is low, the output current greatly deviates from the short-circuit $I_{sh}$ and the photocurrent is small, so that the sensitivity to light is lowered owing to a great influence of the capacitor component C of the Si cell.

FIG. 5 illustrates a circuit called a Miller circuit which is further improved from the circuit of FIG. 4 and in which resistors 61 and 62 are provided for applying a bias voltage across an Si cell 63. Reference numeral 64 indicates a photocurrent charging capacitor, which is connected in parallel with a timing switch 65. Reference numeral 70 designates an amplifier circuit for amplifying the voltage across the Si cell 63, and 72 an output terminal of the amplifier circuit 70.

The circuit is constructed so that when light is incident the Si cell 63 to increase the voltage thereacross, a voltage at the output terminal 72 of the amplifier circuit 70 decreases. Reference numeral 71 designates a zero potential adjusting resistor provided in the amplifier circuit 70, which resistor is connected at both ends to terminals 68 and 69.

Since the circuit is constructed as described above, the adjusting resistor 71 is previously adjusted so that when no light is incident to the Si cell 63 and the voltage between the terminals 68 and 69 is zero, the voltage at the output terminal 72 may be equal to the bias voltage of the Si cell 63, that is, the voltage at the terminal 68.

When the light falls on the Si cell 63 to produce a voltage, the terminal 69 is made positive relative to that on terminal 68. The voltage is amplified by the amplifier 70 to lower the voltage at the output terminal 72 and the lowered voltage on terminal 64 is fed back to the terminal 69 through the capacitor 64 to lower the voltage at the terminal 69. Accordingly, substantially no change is caused in the voltage between the terminals 68 and 69 and the photocurrent can be charged in the capacitor 64 by opening of the timing switch 65.

With the amplification factor $\beta$ of the amplifier circuit 70 being fairly great, the voltage change at the terminal 69 becomes $1/\beta$ as compared with that at the output terminal 72 due to the charging voltage of the capacitor 64 and the voltage across the Si cell can be held very low as indicated by the broken line C in FIG. 1A, the broken line C can be brought close to the ordinate, and the photocurrent can be integrated while being held close to the short-circuit current $I_{sh}$.

However, the amplifier circuit 70 for use in this circuit is required to be capable of excellent performance and high in stability, and hence is very expensive. In general, the amplifier circuit of high amplification factor produces irregular outputs even in the case of no input being applied. This is because of the fact that an unstable output from an element for a first-stage amplifying action, for example, a transistor is amplified by a subsequent amplifier circuit to provide an unstable output. The value obtained by dividing the change in the output voltage by the amplification factor $\beta$ is referred to as an input conversion drift, which is a conversion value representing how much change is required on the input side for making the output constant. Therefore, this conversion value indicates a change in the input which is required for providing the constant output. Consequently, the voltage fed to the Si cell cannot also be reduced lower than the above value theoretically.

FIG. 6 is a graph showing the relation between the drift and the frequency converted from the period of the change in the input. Of course, this relation varies with the biasing condition of the circuit and the amplifying element used but, in general, the drift increases substantially in proportion to the period of the input variation at low frequencies and it approaches a constant value as the frequency becomes higher. This constant value is as small as less than some dozen millivolts. Where the Si cell is employed in a camera, the life time of the camera is several years, so that the period of the drift of the circuit shown in FIG. 5 is also as long as the life time of the camera. If the proportional relation to the period at low frequencies in the graph of FIG. 6 is extended as it is, the value of the drift for the several years becomes very great. Therefore, in practice, even if an adjustment is made by the variable resistor 71 to make the terminals 72 and 68 equipotential while holding the terminals 68 and 69 in their short-circuited condition in the circuit of FIG. 5, the potential at the output terminal 72 appearing at the terminal 69 changes relative to that potential developed at the terminal 68, with the lapse of time, by the value of drift that the period in FIG. 6 corresponds to the several years and, as a result, the voltage fed to the Si cell 63 varies from zero. When this value is large, the error becomes increased on the side of low illumination as described previously.

In addition to the drift with the lapse of time, a temperature drift due to a temperature change and that due to a change in the power source voltage also occur. Accordingly, it is necessary not only to provide many compensating circuits in such an amplifier circuit as shown in FIG. 5 but also to carefully select the characteristics of amplifying elements used, so that the circuit becomes inevitably expensive and the zero point must be re-adjusted at intervals of several or some dozen days.

Thus, the amplifier circuit using the Si cell as a light receiving element for the electronic exposure controlled camera is not employed and, in practice, the Si cell is used with such circuits as depicted in FIGS. 3, 4 and 5 only when the scene illumination to be photographed is sufficiently intense.

Further, in an integrator circuit in which the photovoltaic cell and a capacitor are connected in series to each other, the output from the photovoltaic cell is small, so that its integrating current is small. In addition, the input impedance of a switching circuit is small as compared with the integrating current. Therefore, the output current from the photovoltaic cell is not charged in an integrating capacitor of a delay circuit but flows in the switching circuit, with the result that a current flowing in the integrating capacitor is extremely slight and the circuit does not operate or becomes unstable.

To avoid this, a control circuit has been proposed which employs a field effect transistor for impedance conversion purposes. However, since the characteristics of the field effect transistor greatly vary with ambient temperature or the power source voltage, correction must be always taken into consideration and the control circuit of this kind cannot be put in practical use.

Further, it has also been considered to use two field effect transistors of the same characteristics so as to correct the change in the characteristics due to temperature or voltage change but it is difficult to obtain field effect transistors of the same characteristics and it is necessary to select them from a great number of field effect transistors and, in addition, probability of obtaining the field effect transistors of the same characteristics is low. Accordingly, this method is not suited for mass production and increases the manufacturing cost.

Referring now to FIG. 7, a description will be given of a prior circuit for controlling the shutter speed of an electrical shutter employing the photovoltaic cell as a light receiving element. A photodiode or like photovoltaic cell $D_1$ and a capacitor $C_1$ constitute an integrator circuit and a trigger switch $S_1$ is connected in parallel with the integrating capacitor for shortcircuiting it.

The connection point of the photovoltaic cell $D_1$ and the integrating capacitor $C_1$ is connected to a field effect transistor $T_8$ for impedance conversion and the output from the field effect transistor $T_8$ is applied to one input of a known switching circuit B. The other input of the switching circuit B is connected to an output end of another field effect transistor $T_9$ of the same characteristics as that $T_8$ so as to correct temperature and voltage variations of the field effect transistor $T_8$. The gate of the field effect transistor $T_9$ is connected to a variable resistor R for setting the lens aperture or the like.

With the above construction, it is necessary that the characteristics of the two field effect transistors are accurately coincident with each other but this is extremely difficult as described previously.

SUMMARY OF THE INVENTION

This invention is intended to eliminate the above-described defects encountered in the prior art.

One object of this invention is to provide a light detecting circuit having a photoelectric current integrating type photometric circuit which enables photometry at low illumination levels and improves a delay in response to light.

Another object of this invention is to provide an electric control circuit which employs a photovoltaic cell as a light receiving element and one field effect transistor for the prevention of current flowing from the output thereof in a switching circuit because of the output being small and which is capable of correct control of the shutter speed of an electric shutter or the Strobe unit lighting up time without introducing an error due to a change in the characteristics of the field effect tansistor which is caused by a temperature or voltage change.

This invention includes an integrating capacitor directly connected in parallel with the Si cell. The capacitance composed of the aforementioned capacitor component C of the Si cell and that of the integrating capacitor is used as an integrating capacitor to avoid the delay in the response to incident light which is caused by the capacitor component C of the Si cell. Further, the voltage applied to the cell, that is, Si charging voltage of the integrating capacitor is selected to be 1/10 of the open-circuit voltage $V_{op}$ at the lower limit of illumination in the photometric range and the electrical signal charged up to that value is used as the amount of light integrated, thus utilizing the fact that the charging current of the charging voltage $V_{op}/10$ is the short-circuit current $I_{sh}$ at that illumination.

For example, in the case of photometry at an illumination of 0.01*ex*, the open-circuit voltage $V_{op}$ is 100mV at 0.01*ex* as shown in FIG. 1A and 1/10 of this voltage is 10mV, so that if the value obtained when the charging current has reached 10mV is considered as the amount of integration for photometry, the charging current at this time is 0.01$\mu$A.

Further, its drift voltage is affected by the period of the integration and the drift of the period of several years such as mentioned previously need not be taken into account and where the integration time is, for example, 1 second, only a drift of the period of 1 second is a matter of concern and its value is very small and serves to enable photometry in a low illumination range.

Further, this invention is directed to an electric shutter which is constructed as follows. Namely, in order to avoid a delay in the response to light caused by the capacitor component C of the Si cell and approximate the output current from the Si cell to the short-circuit current $I_{sh}$ at low illumination by decreasing the voltage applied to the Si cell, the capacitance of the integrating capacitor is selected large and the voltage of the integrating capacitor is held at a drift voltage of an amplifier circuit corresponding to the frequency of a period longer than the longest shutter period, for example, about 1 second, that is, a drift voltage of several hundred millivolts corresponding to the period of 1 second in FIG. 6. In the amplification of this minute voltage, a drift signal of long period in FIG. 6 is held in the aforementioned capacitor and its voltage is not applied to the amplifier circuit, and this drift signal is applied to the amplifier circuit as a signal including a drift of a period of the actuation of the shutter. The integrating capacitor is coupled with the amplifier circuit, by which the drift signal is used within a range of small drift. For a drift of long period, a circuit is provided for automatically correcting it and the correcting circuit is disconnected from the amplifier circuit immediately before a shutter release operation. At the same time, the amount of correction immediately prior to that operation is held in a capacitor and a drift of a short period of the shutter operating, that is, a period of signal application is decreased to very small value and the minute voltage of the integrating capacitor is amplified by the amplifier circuit.

BRIEF DESCRIPTION OF THE DRAWINGS

In regard to characteristics, functions and effects of this invention, reference is made to the following detailed description taken in connection with the drawings, in which.

DESCRIPTION OF THE PREFERRED EMBODIMENTS

With reference to the drawings a description will be given of circuits employing the basic construction described in the foregoing.

Figure 8:
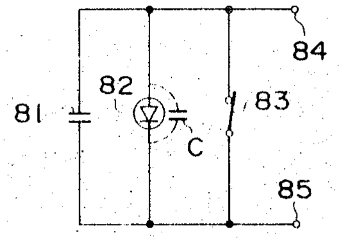
FIG. 8 is a connection diagram showing the basic construction of this invention.
Figure 9:
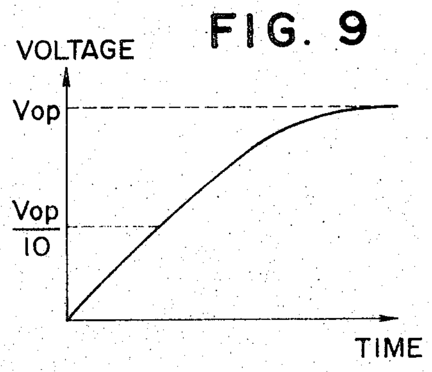
FIG. 9 is a graph showing the relation between a charging voltage of an integrating capacitor in the circuit of FIG. 8 and time.

FIG. 8 shows the basic connection of a photometric circuit of this invention, in which an integrating capacitor 81, an Si cell 82 and a timing switch 83 are connected in parallel with one another. While the timing switch 83 is closed, voltages across the capacitor 81 and the Si cell 82 are zero; under this condition, if light is incident to the Si cell 82, the short-circuit current $I_{sh}$ flows through the switch 83. Opening the switch 83, the output current from the Si cell 82 starts to charge the integrating capacitor 81 and the capacitor component C of the Si cell 82. Until voltage charge reaches the voltage $V_{op}/10$ of the open-circuit voltage of the incident light, the output current from the Si cell 82 is substantially equal to the short-circuit current $I_{sh}$ and exhibits a constant-current charging characteristic. However, when the charging exceeds the voltage $V_{op}/10$, the output current from the Si cell 82 decreases as described previously, so that the voltage charge gradually approaches the open-circuit voltage $V_{op}$. This is illustrated in FIG. 9. Namely, charging up to the voltage $V_{op}/10$ is constant-current charging and exhibits a linear characteristic. In this case, response to light is dependent on the time for the generation of the short-circuit current $I_{sh}$ based on the incidence of the light, and hence is usually as short as $10^{-9}$ to $10^{-8}$ sec. and the response is very rapid. This is far shorter than the response time $10^{-2}$ to $10^{2}$ sec. with the open-circuit voltage.

Accordingly, with the construction shown in FIG. 8, if the voltage 1/10 of the open-circuit voltage $V_{op}$ at the lower limit of illumination to be measured is set as a switching voltage of a trigger circuit connected to terminals 84 and 85 in FIG. 8, it is possible to obtain a photometric circuit whose response to light is $10^{-9}$ to $10^{-8}$ sec. over a range from high illumination to the aforementioned lower limit of illumination to be measured and whose drift has a period within the integration time.

Figure 10:
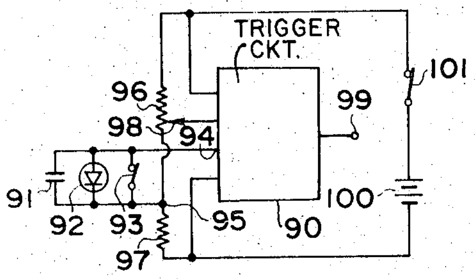
FIGS. 10 to 13 circuit diagrams illustrating various embodiments of this invention.
Figure 11:
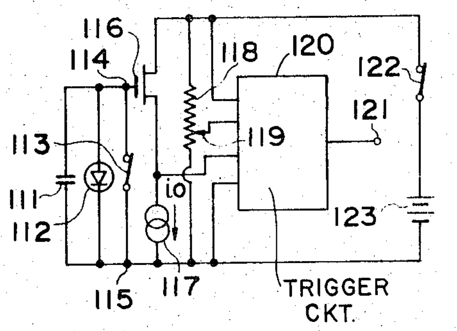

FIG. 10 shows an illustrative embodiment of this invention, in which the output between the terminals 84 and 85 in FIG. 8 is directly applied to a trigger circuit 90. Namely, resistors 96 and 97 are provided for biasing an Si cell 92 and, at the same time, the resistor 96 is used as a potentiometer for setting the trigger level of the trigger circuit 90. The voltage imposed on a slider 98 of the resistor 96 is selected by adjusting the position of slider 98 to be 1/10 of the open-circuit voltage $V_{op}$ at the lower limit of illumination, that is, $V_{op}/10$. Opening a timing switch 93 for starting integration, an integrating capacitor 91 is charged up to $V_{op}/10$ by the output current $I_{sh}$ from the Si cell 92. When the charging has reached the threshold voltage as set by that voltage applied to slider 98, the trigger circuit 90 operates to provide an output at its output terminal 99, after an exposure time inversely proportional to the intensity of light incident on the Si cell 92, beginning at the instant of opening the timing switch 93. In this case, it is ideal that the impedance between the terminals 84 and 85 in FIG. 8, that is, between terminals 94 and 95 in FIG. 9, is infinity at the time of opening the timing switch 93 but since the trigger circuit 90 in the example of FIG. 10 is usually formed with a bipolar transistor, its input impedance is low and if an input light is low in illumination, its short-circuit current $I_{sh}$ is very small, so that this current does not charge the integrating capacitor 91 but instead flows in the trigger circuit 90. In FIG. 11 there is shown a second embodiment of this invention which is free from the above defect.

In FIG. 11, reference numeral 116 indicates a field effect transistor, whose gate input impedance is very high as well-known, and a terminal 114 corresponding to terminal 84 of in FIG. 8 is connected to the gate of this transistor 116. Reference numeral 117 designates a constant current source connected to the drain of the field effect transistor 116, which always provides a constant current $i_o$ in the drain of the transistor 116 to constitute an impedance conversion circuit. Namely, a fluctuating voltage at the gate of the field effect transistor 116 serves as a source voltage of the transistor as it is.

The terminals 114 and 115 have connected thereto a parallel circuit of an Si cell 112, an integrating capacitor 111 and a timing switch 113 as is the case with the first embodiment. The slides 119 of the potentiometer 118 is set to provide the trigger level of a trigger circuit 120 at 1/10 of the open-circuit voltage $V_{op}$ at the lower limit of illumination, that is, $V_{op}/10$, as in the first embodiment.

In the second embodiment, the provision of the impedance conversion circuit formed with the field effect transistor 116 and the constant current source 117 prevents th output current from the cell 112 at the time of low illumination from flowing in the trigger circuit 120 without charging an integrating capacitor 111.

Figure 12:
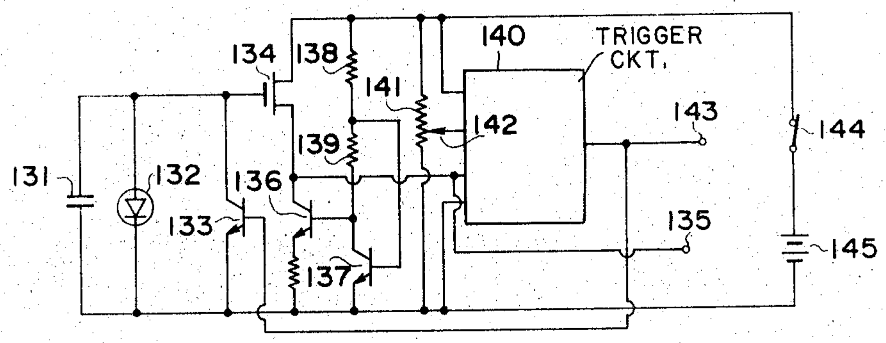

A third embodiment of this invention illustrated in FIG. 12 is adapted to obtain an output of a frequency proportional to the illumination on the light incident on the face of the Si cell. In place of the timing switch used in FIG. 8, the collector and the emitter of a transistor 133 are connected in parallel with an Si cell 132 and an integrating capacitor 131. The base of the transistor 133 is connected to an output 143 of a trigger circuit 140. Transistors 136 and 137 and resistors 138 and 139 show a concrete construction of the constant current source in the second embodiment of FIG. 11 and constitute a constant-current source.

When light is incident on the Si cell 132, its output current charges the integrating capacitor 131. When the charging voltage has reached the voltage $V_{op}/10$ of the trigger circuit 140 which is set by a slider 142 of the potentiometer 141, the trigger circuit 140 is triggered to produce an output signal at its output terminal 143. In response to this output signal, the transistor 133 is rapidly turned on to discharge the voltage stored in the integrating capacitor 131 to zero and, at the same time, the output signal at the output terminal 143 of the trigger circuit 140 disappears to turn off the transistor 133. By repeating such operations, a rectangular wave is produced at the output terminal 143 and a sawtooth wave is produced at an input terminal 135 of the trigger circuit 140, which is an output of a frequency proportional to the illumination on the light receiving face of the Si cell. Reference numeral 134 designates a field effect transistor, which performs the same function as that employed in the second embodiment.

Figure 13:
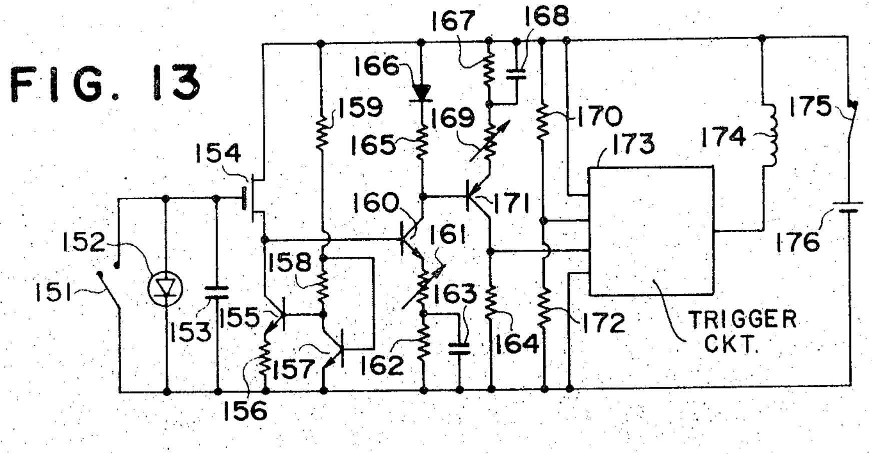

FIG. 13 illustrates a fourth embodiment of this invention. A discharge switch is is connected in parallel with an Si cell 152 and an integrating capacitor 153. Reference numeral 154 designates a field effect transistor for amplifying the voltage of the integrating capacitor 153. A circuit, which comprises a transistor 155, a resistor 157 connected to its emitter, a transistor 157 connected to its base, a resistor 158 connected between the base and the collector of the transistor 157 and a resistor 159 connected between its base and a main switch 175 connected in series to the positive side of a power source 176, serves as a constant current circuit for applying a constant current to the source of the field effect transistor 154.

Figure 1A:
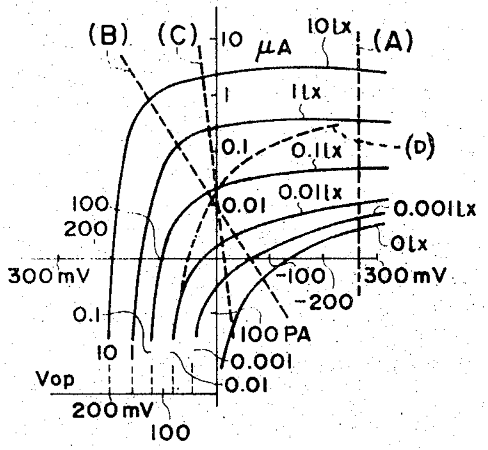
FIG. 1A is a graph showing the relationships of an output voltage from a Si cell and an external voltage impressed thereto, to the logarithmic value of an output current from the cell.
Figure 1B:
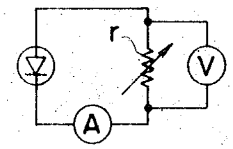
FIG. 1B is a circuit diagram for obtaining the above relationships in the case of no external voltage being applied to the Si cell.
Figure 1C:
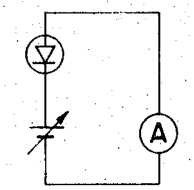
FIG. 1C is a circuit diagram for obtaining the above relationships by changing the external voltage.
Figure 2:
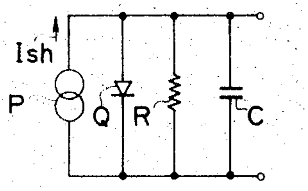
FIG. 2 shows the characteristics of one photovoltaic cell in the form of an equivalent circuit.
Figure 3:
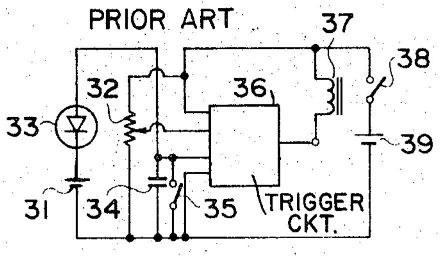
FIG. 3 PRIOR ART
FIGS. 3, 4 and 5 are conventional amplifier circuits for the photovoltaic cell.
Figure 4:
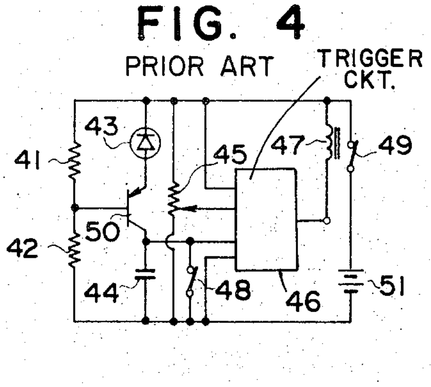
FIG. 4 PRIOR ART

The integrating capacitor 153 connected in parallel to the Si cell 152, is connected also in parallel to the capacitor component C shown in the equivalent circuit of the Si cell in FIG. 2. The composite capacitance performs the integrating function, which is also possible to achieve with only the capacitor component C.

A transistor 160 amplifies the source voltage of the field effect transistor 154. The bias of the transistor 160 is set by a variable resistor 161 connected to its emitter, a resistor 162 connected in series thereto and a resistor 165 connected to its collector. The amplification factor of the transistor 160 is determined by the ratio of the resistance values of its emitter and collector.

A capacitor 163 connected in parallel with the resistor 162 makes up a time constant circuit, which is constructed so that when a varying current flows in the emitter of the transistor 160, the voltage across its emitter does not immediately become proportional to the current but is variously delayed by the time for charging and discharging of the capacitor 163 with the resistor 162.

A transistor 171 is provided for amplifying the collector voltage of the transistor 160 and the base of the former is connected to the collector of the latter. A diode 166 connected in series with a resistor 165 is provided for temperature compensation. A resistor 167 and a variable resistor 169 connected to the emitter of the transistor 171 and a resistor 164 connected to its collector are resistors for biasing the transistor 171. The amplification factor of the transistor 171 is dependent upon the ratio of the resistance values on its emitter and collector sides as is the case with the transistor 160. Further, a capacitor 168 constitutes a time constant circuit together with the resistor 167.

Reference numeral 173 designates a trigger circuit, whose trigger voltage is set by the resistance values of resistors 170 and 172. The trigger circuit 173 is supplied with the collector voltage of the transistor 171 and its output is connected to a relay 174 for starting a shutter closing operation.

In the circuit constructed as described above, the switch 151 and the main switch 175 are in their closed condition at first and, upon opening of a shutter by pressing a shutter button (not shown), the switch 151 is opened. At this time, a photocurrent corresponding to incident light, is generated by the Si cell 152 disposed at a position corresponding to the illumination on the film surface, is applied to charge the integrating capacitor 153. This charged voltage upon the capacitor 153 is coverted by the field effect transistor 154 into an impedance and, further, amplified in voltage by the transistors 160 and 171 to cause a voltage change across the resistor 164. When this voltage change is equal to the threshold voltage set by the resistors 170 and 172, the relay 174 is actuated to closed the shutter to obtain a proper exposure time.

In the amplifying section of this circuit including the transistor 160 and the bias resistors 165, 161 and 162, if their resistance values are taken as $R_{15}$, $R_{11}$ and $R_{12}$, respectively, if the current flowing therein is taken as $I_o$ and the capacitor 153 is neglected, the emitter potential of the transistor 160 is given by $(R_{11}+R_{12})I_o$. If the voltage of the diode 166 is taken as $V_{16}$, the collector potential of the transistor 160 becomes a potential reduced down from the positive side by $V_{16}+R_{15}I_o$.

If the base voltage of the transistor 160 varies by $\Delta V$ and if its emitter current varies by $\Delta I_o$, $(R_{11}+R_{12})I_o$ changes into $(R_{11}+R_{12})\Delta I_o$ and if a voltage change of the diode is neglected because it is small, $(V_{16}+R_{15})I_o$ changes into $R_{15}\Delta I_o$. If a voltage change between the base and emitter of the transistor 160 is neglected, a change in its emitter voltage is the same as that in the base voltage, and hence is given as follows:

$$(R_{11}+R_{12})\Delta I_o = \Delta V$$

Accordingly, the amplification factor $H$ is expressed in the form of the ratio between the changes in the base and collector voltages and consequently it becomes as follows:

$$H = R_{15}\Delta I_o/\Delta V = R_{15}/\ R_{11}+R_{12}$$

This shows that the amplification factor $H$ is the ratio between the resistances on the emitter side and on the collector side as described previously.

Where the input signal changes very slowly, there is ample time for charging the capacitor 163 with the current $I_o$, so that the voltage of the time constant circuit made up of the resistor 162 and the capacitor 163 is not delayed behind the input signal and the amplification factor in this case is as follows:

$$H = R_{15}/\ R_{11}+R_{12}$$

Where the input signal changes rapidly, the change is more rapid than the charging of the capacitor 163 with the current $I_o$, so that the voltage across the resistor 162 does not change with the change in the base voltage of the transistor 160 and the amplification factor $H$ in this case is as follows:

$$H = R_{15}\Delta I_o/\Delta V = R_{15}\Delta I_o/R_{11}\Delta I_o = R_{15}/R_{11}$$

By selecting the resistance value $R_{12}$ of the resistor 162 very high and that $R_{11}$ of the resistor 161 smaller than that $R_{15}$ of the resistor 165, it is possible to obtain the following amplification factors:

$R_{15}/R_{11}+R_{12} \leqq 1$ (amplification factor in the case of slow signal change)

$R_{15}/R_{11} > 10$ (amplification factor in the case of rapid signal change)

The same is true of the bias of the transistor 171.

Figure 14:
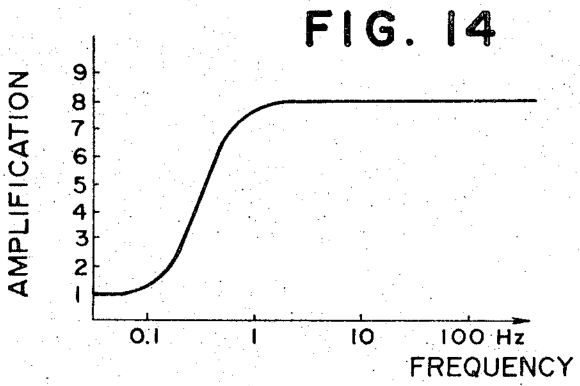
FIG. 14 is a graph showing a change in the amplification factor with regard to input signal frequency, in the embodiment of FIG. 13.

This relation, i.e., the change in the amplification factor with the input signal frequency, is shown in FIG. 14. Namely, the amplification factor is large at high frequencies and small at low frequencies based on the constant determined by the time constant circuit.

Accordingly, in the above amplifier circuit, a large drift of low frequency is never amplified and only a small drift of high frequency is amplified.

Figure 5:
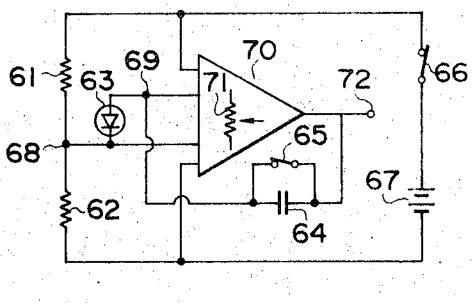
FIG. 5 PRIOR ART
Figure 6:
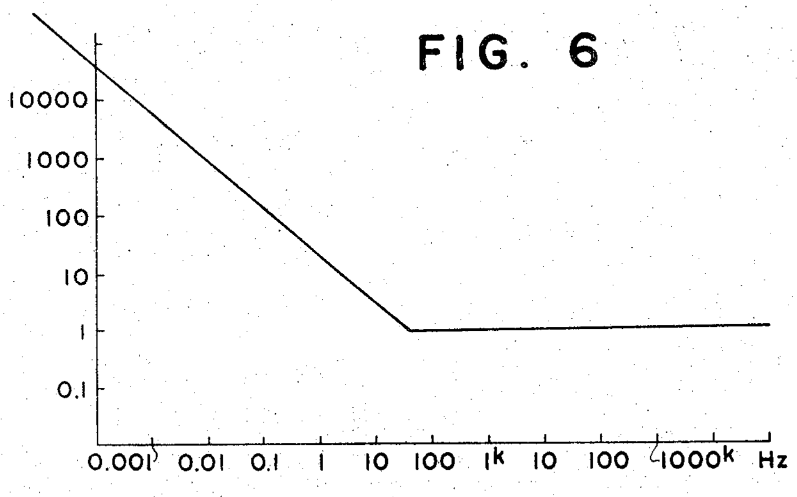
FIG. 6 is a graph showing the relation between the magnitude and period of drift in the amplifier circuit.
Figure 7:
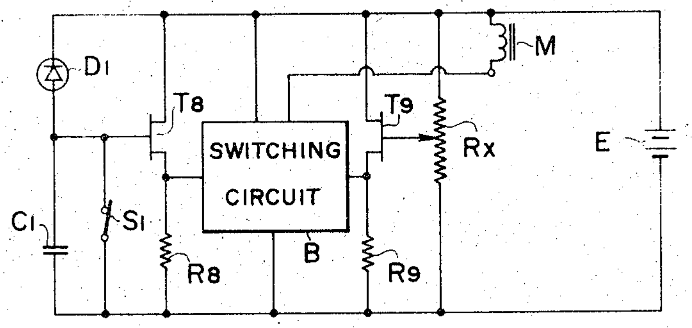
FIG. 7 PRIOR ART.
FIG. 7 is a circuit diagram illustrating one example of a known electric control circuit employing a photovoltaic cell.

Therefore, the voltage of the integrating capacitor 153 can be reduced to the same degree as the drift voltage of high frequency and the voltage which is applied to the Si cell 152 can be reduced less than a few hundredths of that in the circuit shown in FIG. 5.

Figure 15A:
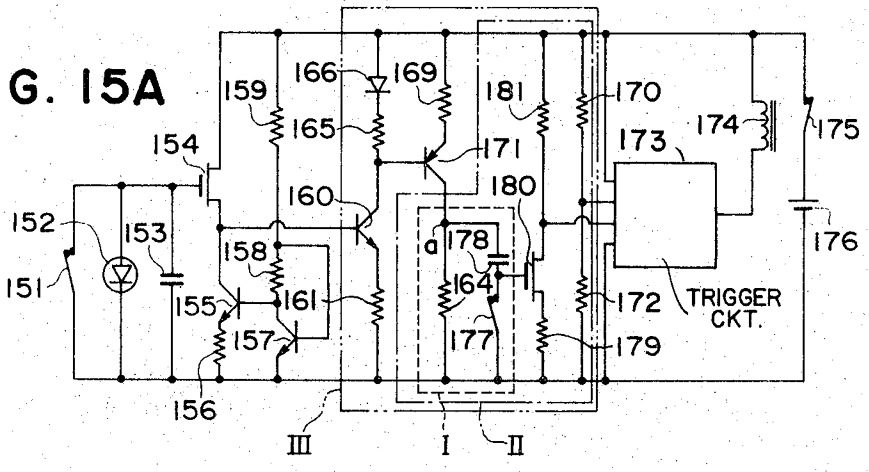
FIG. 15A shows another embodiment of this invention.

FIG. 15A is a circuit diagram illustrating a fifth embodiment of this invention, in which parts corresponding to those in FIG. 13 are marked with the same reference numerals. As is the case with the fourth embodiment, the voltage of the integrating capacitor 153 connected in parallel with the Si cell 152, is converted by the field effect transistor 154 into an impedance and amplified by the transistors 160 and 171 to provide an output at a terminal *a* of the collector of the transistor 171. In this case, however, no time constant circuit is connected to the emitters of the transistors 160 and 171 and only the resistors 161 and 169 are connected thereto respectively, so that a drift of a long period and hence large value is also amplified uniformly, and consequently the voltage at the terminal *a* undergoes a change greater than the input voltage.

In this fifth embodiment, the collector of the amplifying transistor 171 has connected thereto a capacitor 178 of large capacitance connected in parallel with the bias resistor 164 and in series with a switch 177, forming a time constant circuit together with the resistor 164. The connection point of the capacitor 178 and the switch 177 is connected to the gate of a field effect transistor 180.

Accordingly, a drift of long period appears as a change in the voltage at the terminal *a* but this voltage is charged in the capacitor 178 and the gate voltage of the field effect transistor 18 is always zero irrespective of the voltage at the terminal *a* and the drift of long period is cut off. The output from the field effect transistor 180 is applied to the trigger circuit 173.

When the shutter is opened to open the switches applied to 151 and 177, the photocurrent from the Si cell 152 is applied to the integrating capacitor 153, and its charged voltage is amplified by the amplifying transistors 160 and 171 to cause a voltage change at the terminal *a* together with the drift. The instant the switch 177 is opened, the gate voltage of the field effect transistor 180 is zero. The gate voltage also varies with the voltage change at the terminal *a* but the voltage of the capacitor 178 does not substantially change in a short time during which the shutter operates, so that the voltage at the terminal *a* appears as a change in the gate voltage of the field effect transistor 180. Since the shutter operating time is very short, drift in this case is very small and the voltage of the integrating capacitor 153 can be decreased very low as is the case with the fourth embodiment shown in FIG. 13. A resistor 179 is a bias resistor for the field effect transistor 180.

The fifth embodiment of FIG. 15A is different from the fourth embodiment of FIG. 13 in the provision of the switch 177 in the time constant circuit comprising the resistor 164 and the capacitor 178. Consequently, in the fourth embodiment the capacitance of the capacitor 168 is required to be large for discharging during exposure, but in the fifth embodiment there is no possibility that the capacitor 178 is discharged by opening of the switch 177 during exposure, so that the capacitance of the capacitor 178 need not be so large. As a result of this, in the former embodiment the time constant of the time constant circuit becomes large and an appreciable amount of time is required until the drift of long period is absorbed by the capacitor after photographing, while in the latter embodiment the drift of long period is absorbed by the capacitor of the main amplifier circuit immediately after photographing.

Figure 15B:
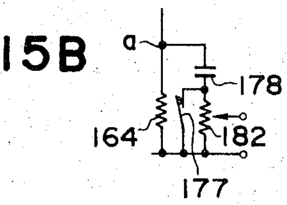
FIGS. 15B, 15C and 15D illustrate modified forms of the circuit depicted in FIG. 15A.

FIG. 15B shows a modification of the circuit section I surrounded by a broken line in FIG. 15A, to permit the use of information of factors for exposure such as film sensitivity and so on to achieve an accurate film exposure. A variable resistor 182 is connected in parallel with the switch 177 of the time constant circuit, by means of which the voltage change at the terminal *a* is divided and applied to the field effect transistor 180, thus providing the same effect as that of changing the amplification factor of the circuit in the fourth embodiment.

Figure 15C:
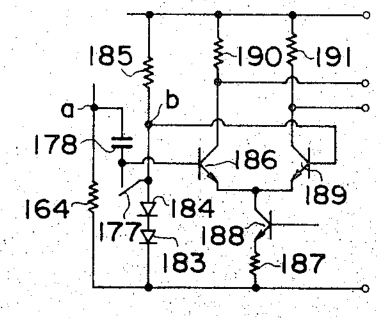

FIG. 15C shows a modified form of the circuit section II surrounded by a one-dot chain line in FIG. 15A, in which diodes 183 and 184 are connected in series with the capacitor 178 and the switch 177, and in parallel with the resistor 164. The diodes 183 and 184 are connected in series to the power source 176 by a resistor 185 for maintaining a constant voltage at a terminal *b* of the connection point of the diodes 183 and 184 with the resistor 185. A resistor 187 is a bias resistor for a transistor 188. The transistor 188 is to obtain a constant current and its base is connected to a circuit of the same relation as in the case of the base of the transistor 155 of FIG. 15A, though not shown.

Two transistors 186 and 187 constitute a differential amplifier circuit and resistors 190 and 191 connected to their collectors are resistors for obtaining outputs, which are applied to the trigger circuit 173 in FIG. 15A. The collectors of the both transistors 186 and 189 are connected to the collector of the aforementioned transistor 188.

In the modified circuit, the drift of long period appears as a change in the voltage between the terminals *a* and *b* and this voltage is charged in the capacitor 178 when the switch 177 is opened, the voltage of the capacitor 178 is held at that value as of the switch opening. Therefore, only the voltage change at the terminal *a* after opening of the switch 177 is amplified by the differential amplifier circuit. The time until the shutter is closed after opening of the switch 177 is extremely short as in the case of FIG. 15A, so that drift in this case is very small and a small input signal can also be amplified.

Figure 15D:
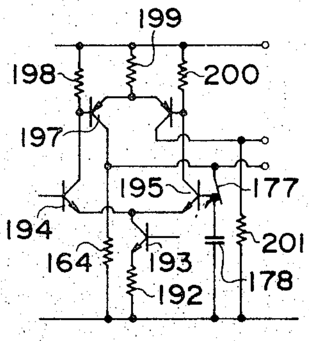

FIG. 15D shows a modification of the circuit section III surrounded by a two-dot chain line in FIG. 15A, in which the same reference numerals as those in FIG. 15A indicate the same elements.

A transistor 193 having connected thereto a bias resistor 192 is a source for providing a constant current and its base is connected to a circuit of the same relation as in the case of the base of the transistor 155 in FIG. 15A. The two transistors 194 and 195 constitute a differential amplifier circuit and their emitters are both connected to the collector of the aforesaid transistor 193. The base of the transistor 194 is connected to the source of the field effect transistor 154 in FIG. 15A and the base of the other transistor 195 is connected to the connection point of the capacitor 178 and the switch 177 of the time constant circuit. Resistors 198 and 200 are provided for deriving an output from the differential amplifier circuit.

Two transistors 196 and 197 and a resistor 199 having connected thereto their emitters form another differential amplifier circuit. The collector of the one transistor 197 is connected to the time constant circuit comprising the resistor 164, the capacitor 178 and the switch 177, and the base of the other transistor 196 is connected to the collector of the aforementioned transistor 195, thereby to effect negative feedback to the differential amplifier circuit formed of the transistors 194 and 195.

A resistor 201 is connected to the collector of the transistor 196 and serves to obtain an amplified output together with the resistor 164 of the time constant circuit. The collectors of the transistors 196 and 197 are connected to the trigger circuit 173 depicted in FIG. 15A.

With such an arrangement as described above, while the switch 177 is closed before opening of the shutter, drift of long period is applied to the base of the transistor 194 and all of it is negatively fed back to the base of the transistor 195, so that the amplification factor of the differential amplifier circuit becomes 1 to provide at the outputs of the resistors 164 and 201, drift which has not entirely been amplified.

When the shutter is actuated to open the switch 177, the potential of the capacitor 178 is held at the value of the charge imposed on the capacitor 178 immediately before opening of the switch 177 and negative feedback is thereby cut off, so that the amplification factor of the circuit is rapidly raised.

Under such conditions, the signal and the drift applied to the base of the transistor 194 are amplified and appear as the voltage difference between the resistors 164 and 201, but since the drift has a period within the shutter operating time, it is very small and the voltage fed to the Si cell 152 can be held very low as in the case of FIG. 15A. It will be seen that the exposure factor coverting means depicted in FIG. 15B is also naturally applicable to the circuits of FIGS. 15C and 15D. Further, it is also possible in each of the circuits of FIGS. 15A, 15C and 15D that the exposure factor is changed by varying the amplification factor of the circuit by altering the resistor determining the amplification factor as in the fourth embodiment of FIG. 13. Controls of the exposure factor is also possible by changing the capacitance of the integrating capacitor 153.

As has been described in the foregoing, the present invention has such advantages that a delay in the response of a photovoltaic cell due to the capacitor component of the cell is avoided by directly connecting an integrating capacitor to the photovoltaic cell; that a minute voltage produced by the photovoltaic cell which has heretofore been impossible of amplification can be accurately amplified by adding a capacitor to a conventional amplifier circuit; that the range of the brightness of of scene illumination (especially the lower end) is widened by employing in the exposure control circuit a photovoltaic cell as a light receiving element and imposing a voltage thereon of less than 1/10 of the opencircuit voltage at the lower limit of illumination, and that photographing with a flash bulb or a light adjustable strobe unit can be controlled.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A light sensitive circuit comprising:

a. a photovoltaic cell;

b. a capacitor element;

c. switch means actuatable for initiating a variable time interval;

d. said photovoltaic cell, said capacitor element and said switch means being connected in a parallel circuit with each other, whereby upon opening of said switch means, said capacitor element is charged with a signal; and e. circuit means responsive to the signal of said parallel circuit of a threshold level to provide an output signal after the timing interval, said threshold level being selected within a range of a signal charged on said capacitor element with a charging current substantially equal to a short circuit current of said photovoltaic cell, whereby said timing interval is inversely proportional to the intensity of light directed onto said photovoltaic cell.

2. A light sensitive circuit comprising:

a. a photovoltaic cell;

b. an integrating capacitor element;

c. switch means actuatable to initiate a timing interval;

d. said photovoltaic cell, said integrating capacitor element and said switch means being connected in a parallel circuit whereby upon opening of said switch means, said photovoltaic cell applied a signal to charge said integrating capacitor element; and e. circuit means responsive to the signal developed on said integrating capacitor element of a threshold level to provide an output signal after the timing interval, said threshold level being selected to be approximately one-tenth of the open circuit voltage of said photovoltaic cell at the lower limit of light intensity to be measured by said light sensitive circuit, whereby the timing interval is inversely proportional to the intensity of illumination directed onto said photovoltaic cell.

3. A light sensitive circuit responsive to scene illumination for controlling the exposure interval of a shutter mechanism, said light sensitive circuit comprising:

a. a photovoltaic cell disposed to receive the scene illumination said photovoltaic cell responsive to scene illumination to provide a linear output corresponding to the scene illumination;

b. a capacitor element;

c. switch means responsive to the opening of the shutter mechanism to initiate the exposure interval;

d. said photovoltaic cell, said capacitor element and said switch means being connected with each other in a parallel circuit, whereby upon opening of said switch means, said capacitor element is charged with the cell output; and e. trigger circuit means responsive to the charged signal on said capacitor element of a threshold level, for providing an output signal, said threshold level being set within said range of said photovoltaic cell whereby said output of said trigger circuit means occurs after an exposure interval inversely proportional to the intensity of the scene illumination incident on said photovoltaic cell.

4. A light sensitive circuit for controlling the exposure interval of a shutter mechanism, said light sensitive circuit comprising:

a. a photovoltaic cell disposed to receive scene illumination;

b. switch means responsive to the opening of the shutter mechanism to initiate the exposure interval;

c. an integrating capacitor element;

d. said photovoltaic cell, said switch means and said capacitor element being connected in parallel with each other whereby a signal is charged on said integrating capacitor element;

e. means coupled to said integrating capacitor element for converting the impedance of its charged signal;

f. amplifier means responsive to the converted output of said conversion means after said switch means is actuated by the shutter mechanism to initiate the exposure interval;

g. time constant means coupled to the output of said amplifier means for absorbing a long period drift of said amplifier means;
h. trigger circuit means responsive to the output of said amplifier means of a threshold level to provide an output signal; and
i. actuating means responsive to the output of said trigger circuit means for actuating the shutter mechanism to terminate the exposure interval.

5. The light sensitive circuit as claimed in claim 4, wherein said time constant means comprises a second capacitor element and a resistor element.

6. The light sensitive circuit as claimed in claim 4, wherein said time constant means includes a resistor and a second capacitor element, at least one of said resistor and said second capacitor being altered to vary the amplification factor of said amplifier means.

7. The light sensitive circuit as claimed in claim 6, wherein said amplification factor is varied dependent on the sensitivity of a photographic medium exposed by the shutter mechanism.

8. The light sensitive circuit as claimed in claim 4, wherein said time constant means comprises a resistor and a second capacitor element connected in a second parallel circuit, said amplifier means comprising an amplifying transistor, said second parallel circuit connected to said amplifying transistor for providing an emitter bias therefor, said amplifying transistor providing a signal across said resistor in proportion to a drift or relatively long period whereby the amplification factor of said amplifying transistor is maintained relatively low, in response to a drift of short period, said second capacitor element of said time constant means being charged and discharged to tend to cancel the signal across said resistor whereby the amplification factor of said amplifying transistor is raised.

9. The light sensitive circuit as claimed in claim 4, wherein said time constant means comprises a second capacitor element, a resistor and a switch, said switch responsive to the opening of the shutter mechanism to be opened.

10. The light sensitive circuit as claimed in claim 4, wherein said time constant means comprises a second capacitor element and a resistor, and there is further included second switch means connected in series with said second capacitor element of said time constant means, said second switch means responsive to the opening of the shutter mechanism to be opened.

11. The light sensitive circuit as claimed in claim 10, wherein said second switch means is coupled to said first-mentioned switch means to be actuated together in response to the opening of the shutter mechanism.

12. The light sensitive circuit as claimed in claim 11, wherein said amplifier means comprises a differential amplifier circuit having first and second input terminals, said first input terminal being connected in series by said second switch means to said second capacitor element and to a reference signal source, said second input terminal being connected to the point of interconnection between said second capacitor element and said second switch means.

13. The light sensitive circuit as claimed in claim 11, wherein said amplifier means comprises a differential amplifier circuit having first and second input terminals, said first input terminal being associated with the output of said conversion means, said second input terminal being connected to the point of interconnection between said second capacitor element and said second switch means whereby said time constant means receives an amplified signal in-phase with the signal applied to said differential amplifier circuit.

14. The light detector circuit as claimed in claim 4, wherein said time constant means comprises a first resistor and a second capacitor element connected in series with a variable resistor, said series connected variable resistor and said second capacitor element being connected in parallel with said first resistor, and a switch connected in parallel with said variable resistor, the resistance of said variable resistor being dependent upon the sensitivity of a photographic medium exposed by the shutter mechanism.

15. A light measuring circuit comprising:
a. a photovoltaic cell disposed to receive light, the intensity of which is to be measured;
b. an integrating capacitor element;
c. switch means actuatable for applying the output of said photovoltaic cell to be integrated by said integrating capacitor;
d. said integrating capacitor and switch means being connected to form a first parallel circuit;
e. amplifier means for amplifying the output of said parallel circuit; and
f. means for absorbing a long-period drift of said amplifier means comprising a resistor and a capacitor element connected together to form a second parallel circuit;
g. said amplifier means comprising an amplifying transistor, said second parallel circuit being connected to said amplifying transistor for providing an emitter bias therefor, said amplifier means applying a signal across said resistor dependent upon a long-period drift of said amplifier means to maintain an amplification factor of said amplifying transistor low, in response to a drift or relatively short period, said second capacitor element of said absorbing means being charged and discharged for cancelling the signal applied across said resistor of said absorbing means, whereby the amplification factor of said amplifying transistor is raised.

16. The light measuring circuit as claimed in claim 15 adapted for use with a shutter mechanism for controlling the exposure of scene illumination onto a photographic medium, wherein said absorbing means further comprises a switch responsive to the opening of the shutter mechanism to be opened.

17. The light measuring circuit as claimed in claim 15, adapted for use with a shutter mechanism for controlling the exposure of scene illumination onto a photographic medium, wherein said absorbing means comprises a switch connected in series with said second capacitor of said absorbing means and responsive to the opening of the shutter mechanism to be opened.

18. The light measuring circuit as claimed in claim 15, adapted for use with a shutter mechanism for controlling the exposure interval of a photographic medium, wherein said absorbing means further comprises a variable resistor, said second capacitor connected in series circuit with said variable resistor, said series circuit being connected in parallel with said first-mentioned resistor, and a switch connected in paralell with said variable resistor, the resistance of said variable resistor being set in accordance with the sensitivity of the photographic medium.

19. The light measuring circuit as claimed in claim 18, wherein said amplifier means comprises a differential amplifier circuit having first and second inputs, said first input being connected to said switch of said absorbing means and to a reference potential source, said second input being connected to the point of interconnection between said second capacitor element and said switch of said absorbing means.

20. The light measuring circuit as claimed in claim 18, wherein said amplifier means comprises a differential amplifier circuit having first and second inputs, said first input being asoociated with the output of said first parallel circuit, said second input being connected to the point of interconnection of said second capacitor element and said switch of said absorbing means whereby the output of said amplifier means is applied to said absorbing means in-phase with the signal applied to said second input of said differential amplifier circuit.

21. A light measuring circuit for controlling the exposure interval of a shutter mechanism, said light measuring circuit comprising:

a. a light sensitive element disposed to receive the light whose intensity is to be measured and to provide an output indicative of the light intensity;
b. means for providing an output control signal for controlling the exposure interval of the shutter mechanism in accordance with the output derived from said light sensitive element, the output control signal provided by said signal providing means having a relatively long-period drift; and
c. absorbing means associated with said signal providing means including a capacitor for absorbing a long-period drift of the output control signal of said signal providing means.

22. The light measuring circuit as claimed in claim 21, wherein said signal providing means includes amplifier means for amplifying the output derived from said light sensitive element and said capacitor of said absorbing means is connected with said amplifier means with a resistor connected in parallel therewith to form a time constant circuit of a time constant substantially larger than the lowest shutter speed of the shutter mechanism for lowering the amplification factor of said amplifier means in a range of particularly low frequencies.

23. The light measuring circuit as claimed in claim 21, wherein said absorbing means includes a plurality of time constant circuits, each of which comprises a capacitor and a resistor connected in parallel therewith and has a time constant larger than the lowest shutter speed for lowering the amplification factor of said amplifier means in a range of particularly low frequencies.

24. The light measuring circuit as claimed in claim 23, wherein said amplifier means includes amplifying transistors and said plurality of time constant circuits are connected in series to the emitters of said amplifying transistors, respectively.

25. The light measuring circuit as claimed in claim 21, wherein said signal providing means includes amplifier means for amplifying the output derived from said light sensitive element and trigger circuit means responsive to the output from said amplifier means of a threshold level for providing said signal for controlling the exposure interval, and said capacitor of said absorbing means is connected between the output of said amplifier means and the input of said trigger circuit means with a switch connected between the input of said trigger circuit means and a point of fixed voltage, said switch being opened upon initiation of exposure.

26. The light measuring circuit as claimed in claim 25, wherein said capacitor of and absorbing means is connected to the input of said trigger circuit means through a variable resistor connected in parallel with said switch, said variable resistor being set in accordance with the sensitivity of a photographic medium used.

27. The light measuring circuit as claimed in claim 21, wherein said signal providing means includes amplifier means for amplifying the output derived from said light sensitive element, said amplifier means including a differential amplifier circuit having first and second inputs, and said capacitor of said absorbing means is connected between the output of said light sensitive element and said first input of said differential amplifier circuit with a switch connected between said first and second inputs of said differential amplifier circuit, said switch being opened upon initiation of exposure.

28. The light measuring circuit as claimed in claim 21, wherein said signal providing means includes amplifier means for amplifying the output derived from said light sensitive element, said amplifier means including a differential amplifier circuit having a first input supplied with the output derived from said light sensitive element and a second input, and said capacitor of said absorbing means is connected between said second input and a point of fixed voltage with a negative feedback circuit connected to said second input through a switch, said switch being opened upon initiation of exposure.

29. The light measuring circuit as claimed in claim 21, wherein said signal providing means includes a first circuit for receiving the output derived from said light sensitive element and a second circuit for producing said signal for controlling the exposure interval, and said capacitor of said absorbing means is connected between the output of said first circuit and the input of said second circuit with a switch connected between the input of said second circuit and a point of fixed voltage, said switch being opened upon initiation of exposure.

* * * * *

PO-1050
(5/69)

UNITED STATES PATENT OFFICE
CERTIFICATE OF CORRECTION

Patent No. 3,849,786 Dated November 19, 1974

Inventor(s) Yasuhiro NANBA and Motonobu MATSUDA

It is certified that error appears in the above-identified patent and that said Letters Patent are hereby corrected as shown below:

Column 4, line 47, insert -- on -- between "dent" and "the"

Column 7, line 30 and line 31 (each occurrence) change "0.01ex" to -- 0.01$\ell$x Column 11, line 63, change "$(V_{16}+R_{15})I_o$" to -- $V_{16}+R_{15}I_o$ --

Column 12, line 7 and line 19, the right term of the equation should be:

$$-- R_{15}/(R_{11}+R_{12}) --$$

Column 12, line 33, the left term of the equation should read:

$$-- R_{15}/(R_{11}+R_{12}) --$$

Column 20, line 17, before "absorbing" change "and" to -- said --.

Signed and sealed this 18th day of March 1975.

(SEAL)
Attest:

RUTH C. MASON
Attesting Officer

C. MARSHALL DANN
Commissioner of Patents
and Trademarks